(12) United States Patent
Strogov et al.

(10) Patent No.: US 12,141,283 B2
(45) Date of Patent: Nov. 12, 2024

(54) ROOTKIT DETECTION BASED ON SYSTEM DUMP FILES ANALYSIS

(71) Applicant: Acronis International GmbH, Schaffhausen (CH)

(72) Inventors: Vladimir Strogov, Schaffhausen (CH); Sergey Ulasen, Singapore (SG); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 257 days.

(21) Appl. No.: 17/646,485

(22) Filed: Dec. 30, 2021

(65) Prior Publication Data

US 2023/0214489 A1  Jul. 6, 2023

(51) Int. Cl.
*H04L 29/00* (2006.01)
*G06F 21/56* (2013.01)
*G06N 20/00* (2019.01)

(52) U.S. Cl.
CPC ........... *G06F 21/566* (2013.01); *G06N 20/00* (2019.01); *G06F 2221/034* (2013.01)

(58) Field of Classification Search
CPC .. G06F 21/566; G06F 2221/034; G06N 20/00
USPC ......................................................... 726/23
See application file for complete search history.

(56) References Cited

U.S. PATENT DOCUMENTS

| | | |
|---|---|---|
| 7,571,482 B2 | 8/2009 | Polyakov et al. |
| 7,647,636 B2 | 1/2010 | Polyakov et al. |
| 8,856,927 B1 | 10/2014 | Beloussov et al. |
| 9,245,114 B2 | 1/2016 | Thomas et al. |
| 9,400,886 B1 | 7/2016 | Beloussov et al. |
| 9,787,699 B2 | 10/2017 | Suominen |
| 10,318,731 B2 | 6/2019 | Liao et al. |
| 10,341,355 B1 | 7/2019 | Niemoller et al. |
| 10,417,420 B2 | 9/2019 | Zhang |
| 11,025,649 B1 | 6/2021 | Bilge et al. |
| 11,562,068 B2 | 1/2023 | Yavo et al. |
| 2007/0162975 A1 | 7/2007 | Overton et al. |
| 2012/0079596 A1* | 3/2012 | Thomas ............... H04L 63/1433 726/24 |
| 2015/0089655 A1 | 3/2015 | Choi et al. |
| 2020/0186542 A1 | 6/2020 | Strogov et al. |
| 2020/0314117 A1* | 10/2020 | Nguyen ................ H04L 63/145 |
| 2021/0216667 A1 | 7/2021 | Strogov et al. |

FOREIGN PATENT DOCUMENTS

| | | |
|---|---|---|
| CN | 102147843 A | 8/2011 |
| CN | 110618854 A | 12/2019 |
| CN | 112560018 A | 3/2021 |
| CN | 113010268 A | 6/2021 |

(Continued)

*Primary Examiner* — Brandon Hoffman
*Assistant Examiner* — Michael D Anderson
(74) *Attorney, Agent, or Firm* — ESPE Legal Consultancy FZ-LLC (57) ABSTRACT

A rootkit detection system and method analyzes memory dumps to determine connections between intercepted system driver operations requested by unknown files and changes in system memory before and after those operations. Memory dump differences and I/O buffers are analyzed with machine learning models to identify clustered features associated with rootkits.

20 Claims, 4 Drawing Sheets

(56) References Cited

FOREIGN PATENT DOCUMENTS

| | | |
|---|---|---|
| GB | 2543813 A | 5/2017 |
| IN | 202021049597 A | 11/2020 |
| IN | 202121039124 | 9/2021 |
| KR | 101824583 B1 | 9/2017 |
| KR | 20190109203 A | 9/2019 |
| WO | WO2019125516 A1 | 6/2019 |

* cited by examiner

ROOTKIT DETECTION BASED ON SYSTEM DUMP FILES ANALYSIS

FIELD OF THE INVENTION

The invention pertains to the field of computer security, in particular the analysis and prediction of malicious behavior by software modules, programs, and files.

BACKGROUND OF THE INVENTION

One of the most difficult cyber threats to detect is a rootkit. It follows from the threat's definition that a rootkit operates at the kernel level of the system. This allows the rootkit to disguise itself as a trusted process. The rootkit may also hide other vestiges of the attack, such as files, processes, and memory areas. Thus, a rootkit cannot generally be detected from user space.

Infection of a computer system with a rootkit is usually carried out through a vulnerability in one of the system drivers. Drivers interact with devices directly or indirectly by providing auxiliary functions. A typical attack kill chain begins with a malicious process on the system running in user mode. Possible sources of infection include visiting an infected site, downloading and running an infected file, and so on. The malicious process downloads the rootkit code, creates a memory buffer, and communicates with a vulnerable driver (e.g., by win32 API). The process exploits the vulnerability by writing a buffer with malicious code to the driver. This malicious code allows the process to intercept and control the driver and, through the driver's access to the kernel, gain control of the system. The code can be written to a file on disk, or a malicious driver can be added to the system. The infection is repeated every time the system is rebooted with the malicious code.

Repairing a system with a rootkit involves substantial effort. The process requires, for example, analyzing a memory image or using a driver that controls the interaction of the operating system, drivers, and applications.

Preventing rootkit infections is hard because the infection path is almost impossible to track. Signature-based methods for detecting file systems and network connections cannot determine the infection path. Dynamic (behavior-based) methods are not effective because all actions in a computer system by root appear to be legitimate. Constant monitoring of an operating system at all times is possible but not practical or an efficient use of system resources. Improved means to detect rootkit infections that do not impose a burden on system resources are needed.

SUMMARY OF THE INVENTION

The present invention automates the process of analyzing memory dumps and reveals connections between driver operations before infection. System memory dumps are collected for forensic purposes. For efficiency, the collection of these memory dumps can be limited to edge cases where the malware classification has less confidence. For example, in production the diagnostic filter driver (kernel mode) sends buffers to a machine learning routing service and dump generator control. In this context, a buffer is a memory area that stores data being transferred between two devices or between a device and an application. The machine learning routing service blocks the buffer when malware is detected with high confidence. For midlevel confidence, collection of backup dumps begins for manual and automatic analysis. If a buffer is classified as safe with high confidence, then the buffer is passed without interference.

Memory dumps are disassembled to work with textual representations of functions that can be analyzed with machine learning models. A machine learning model is a file or program that has been trained to recognize certain types of patterns. Alternatively, binary representations of functions are analyzed for infection of the system by a rootkit, both by family and specific instance. Disassembled memory dumps are processed using machine learning to highlight features that characterize an infected memory dump. These features can be used to determine infection using a binary classification (e.g., Y or N) or to classify the malware by type. With binary data, the memory dump is divided into chunks. The chunks are encoded into frames or matrices by which classifications can be made.

In one embodiment, regular physical memory dumps are received for analysis without rebooting using one or more drivers. Network connections are extracted for the processes, along with lists of files opened by the processes. The likelihood of a rootkit is determined based on a set of kernel procedures using a machine learning model with manual feature selection or a convolutional neural network.

In an embodiment, a computer implemented method for rootkit detection in a computer system comprises executing threat samples and trusted application samples in a testing environment to collect requests to a system driver and identify changes in a system memory dump before and during execution. A machine learning model is trained for samples clustering using paired system driver requests and corresponding to system memory dump changes. As a result, a set of clusters definitions are defined, and at least one of the clusters includes samples related to rootkits.

In an embodiment, an unknown application is monitored for rootkit detection outside the testing environment by intercepting unknown application requests to the system driver and capturing system memory dump changes corresponding to an intercepted request.

In an embodiment, system memory dump changes are captured corresponding to an intercepted request outside the testing environment by a filter kernel driver without rebooting the computer system.

In an embodiment, a determination is made whether the unknown application is a rootkit using the machine learning model for samples clustering or the set of cluster definitions. In a further embodiment, a set of application data is collected comprising a set of intercepted application requests to the system driver and system memory dump changes corresponding to an intercepted request. In a further embodiment, a further system memory dump for forensic analysis is collected if the step of determining whether the unknown application is a rootkit is inconclusive.

DETAILED DESCRIPTION

A memory dump is a process that displays and stores the contents of a computer system's memory. Such a memory dump contains distinctive features. These features include specific functions, the number of function calls, the number of library calls, the presence of a library, calling a function or library from a specific process, or changing process imports. The invention discloses memory-dump analysis tools and related computer system components that improve the ability of a computer system to identify features correlated with malware such as rootkits.

A feature also refers more specifically to an input variable used for making predictions by way of a machine learning model. The invention allows autonomous detection of the presence of a rootkit in a computer system, as well as detection of attempts to infect the computer system with a rootkit.

The invention includes a filter kernel driver in kernel space that intercepts and checks input/output (I/O) to the system drivers. Special attention is paid to drivers with known vulnerabilities and all I/O operations with these drivers are logged. These logs later make it possible to determine the relationship between a detected rootkit and the process initiating the infection. The logs further allow for identification of the original system object containing the malicious code, which may be a file, a network package, or other objects.

The invention also includes a test environment like a sandbox for evaluating the behavior of test samples. The testing environment is a set of computer systems or virtual machines with different configurations. These configurations include, for example, different versions of the operating system and different sets of drivers. For example, the drivers may support devices such as video cards, network cards, or read/write device drivers. Further configuration parameters include different installed applications and different security settings. Some of the objects in the test environment can be virtualized or emulated by software. In an embodiment, the test environment models as closely as possible the computer system to be protected.

The test environment is used for evaluating rootkit samples. Before starting a rootkit and performing rootkit functions, a memory dump of the test environment is taken for each sample (or set of samples) in a malware samples collection. During the test infection, memory dumps corresponding to the state of the system in the process of infecting the system are also taken, including a memory dump corresponding to the active infection of the system with a rootkit and the execution of the rootkit's main functions.

The test environment is also used for evaluating a collection of clean files that correspond to memory dumps of uninfected systems.

The log of operations, including operations with the drivers of the test environment, comprises a first data input passed to the first input the machine learning model, and the diffs of dumps from the test environment make up a second data input passed to the second input of the machine learning model. Diff generally refers to a calculation of differences in data and the output of that calculation. In this context, the diff refers to the calculated difference between the system dump corresponding to the active phase of infection and the initial system dump.

Using the results of the test environment, the machine learning model is trained to determine the similarity between two datasets. In other words, a causal relationship is identified by way of the differences between changes in the memory area (memory diffs) and from the operation of the sample (buffer). Similarity determinations are made by clustering and thereby classifying pairs of a given sample, such as buffer and memory diff. This process highlights the clusters and thereby classifies objects corresponding to malicious objects such as rootkits and to known safe objects. Cluster definitions are based on characteristic features of the buffer, the memory diff dump, or the buffer and the memory diff dump as a whole. These cluster definitions will be used after training to classify an unknown object using the trained machine learning model. The trained model's testing input will include I/O buffer operations of unknown applications, memory diff dumps, or a combination of both sources.

The machine learning model's training is accomplished by way of neural networks configured to identify relationships between two objects. In an embodiment, a Siamese neural network is used. A Siamese neural network is a non-linear display of data with the aim of bringing similar objects closer to each other and spreading different objects as far as possible. This type of machine learning model compares data of different types and determines their relationship. The Siamese neural network employs two identical neural subnets with the same set of weights. Such a network allows for comparison of the vectors of features of two objects to highlight their semantic similarity or difference. Alternatively, a Triplet network may be used. This network comprises three instances of a feed-forward neural network with shared weights. When passed three samples, the network's output will be two intermediate values. For example, given three inputs (x, y, and z) the network will encode the pair of distances between each of x and y with reference to z. Thus, good and bad memory dumps can be compared with system requests or buffers in I/O operation. This neural network produces a model that can determine significant features of the buffer and identify threats with fewer false positives. Other clustering algorithms may be selected from among those used for unsupervised learning models.

As a result of model training, "operation-memory change" pairs are determined that correspond to rootkits. For example, the attributes of rootkits, such as exploitation of driver vulnerabilities, driver infection, and malicious actions are paired with operation-memory change pairs. The result of bad and good samples analysis using the machine learning model are clusters of objects, wherein at least one of the clusters is a collection of feature vectors that correspond to rootkits. Using such a machine learning model, each request to a driver can be compared with cluster entries and its operation blocked or allowed based on the verdict.

Figure 1:
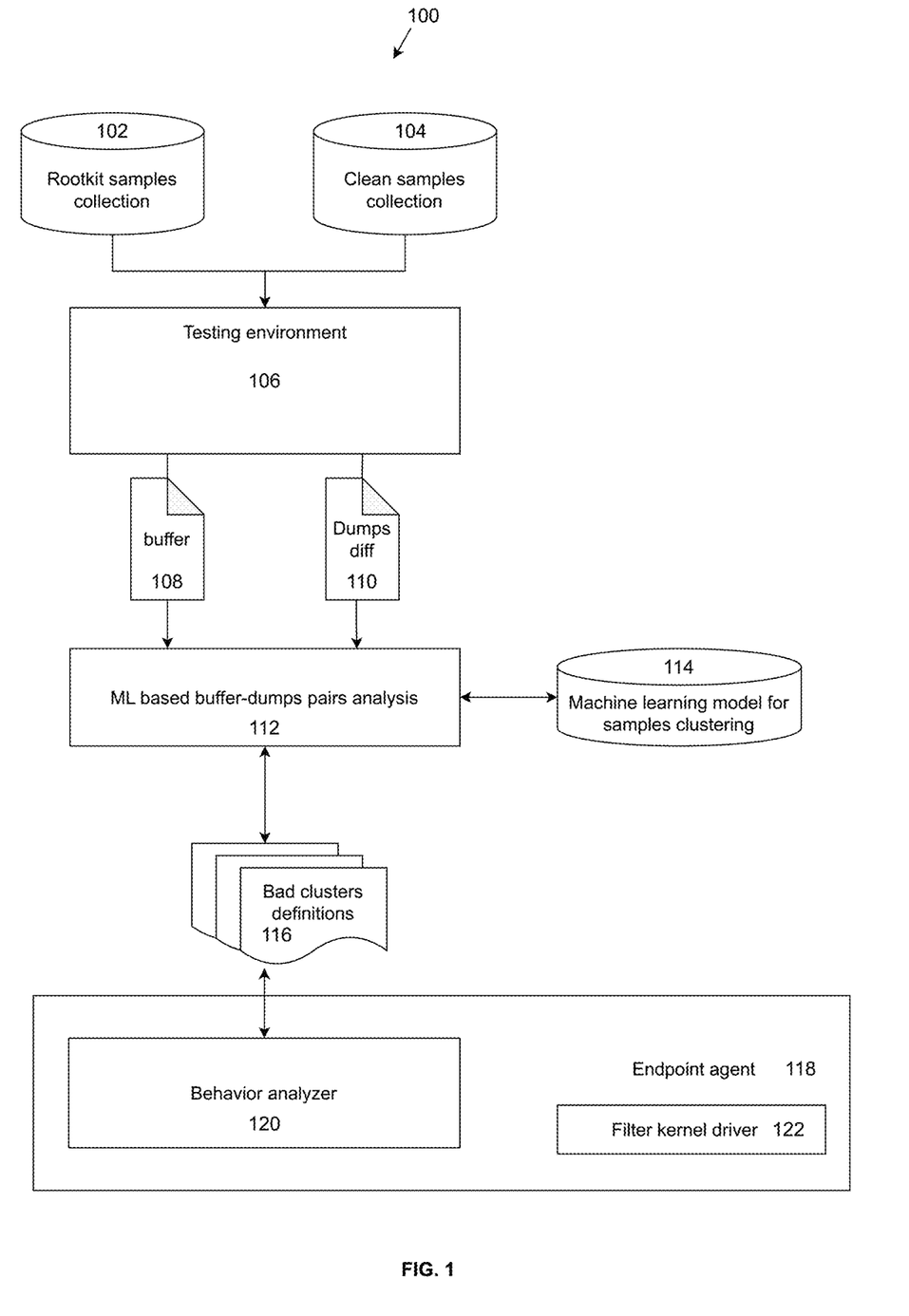
FIG. 1 shows a system for rootkit detection based on analysis of a system memory dumps.

FIG. 1 shows a system 100 for rootkit detection based on analysis of system memory dumps. A rootkit samples collection 102 and a clean samples collection 104 are provided as inputs for testing environment 106. Samples from collections 102 and 104 include not only executable code, but also related software such as installers, downloaders, and so on. In testing environment 106, all operations addressed to a driver are logged in buffer 108. Before installing a rootkit sample and performing rootkit functions in testing environment 106, a memory dump of the test environment is taken for each sample or set of samples from rootkit samples collection 102. During the test infection, more memory dumps are taken. For example, a memory dump corresponding to the state of the system in the process of being infected may be taken, including a memory dump corresponding to the active infection of the system with a rootkit and the execution of the rootkit's main functions. The plurality of memory dumps is compared and difference stored as dumps diff 110. This process is repeated for a predetermined number of rootkit samples in collection 102 and clean samples in collection 104. The buffer 108 and dump diff 110 for each sample are sent for buffer-dumps pairs analysis unit 112 for rootkit cause analysis. The object of this analysis is to determine the driver operations that are linked with rootkit infections. Buffers are paired with dump diffs to create clusters that will be correlated to the presence or absence of a rootkit.

Pairing may be accomplished by different methods. For example, a Siamese neural network may be used. Such a network has two effectively identical neural subnets with the same set of weights and allows for comparison of the vectors of features of two objects to highlight their semantic similarity or difference. Weights control the signal or connection strength between two nodes of a neural network and generally determines how much influence the input has on the output. A Siamese neural network offers a non-linear display of data with the aim of bringing similar objects closer to each other and spreading different objects as far as possible. Alternatively, Triplet network—a network comprising three instances of a feed-forward neural network with shared parameters—may also be used.

As a result of buffer-dumps pairs analysis, clusters are established by machine learning model 114 for samples clustering. Clustering is a machine learning technique that involves grouping a set of data points by way of an algorithm used to classify each data point into a specific group with similar properties or features. At least one cluster will be the dataset that characterizes a rootkit infection. Predicted features of such clusters are buffer and API calls, memory pages, and memory dumps. Bad cluster definitions 116, the memory signs related to rootkits determined by data clustering, are received at endpoint agent 118 by way of behavior analyzer 120. Bad cluster definitions 116 may be used by endpoint agent 118 to classify rootkits. Endpoint agent 118 further employs filter kernel driver 122 to intercept and check input/output (I/O) to the system drivers as will be explained further in connection with FIGS. 2 and 3. An endpoint refers generally to a remote computing device in communication with a computer network. For example, common endpoints include desktops, laptops, smartphones, tablets, servers, workstations, and Internet-of-Things devices. Endpoint agent 118 is an application or program that generally performs protective functions on behalf of an endpoint by way of behavior analyzer 120 and filter kernel driver 122.

Figure 2:
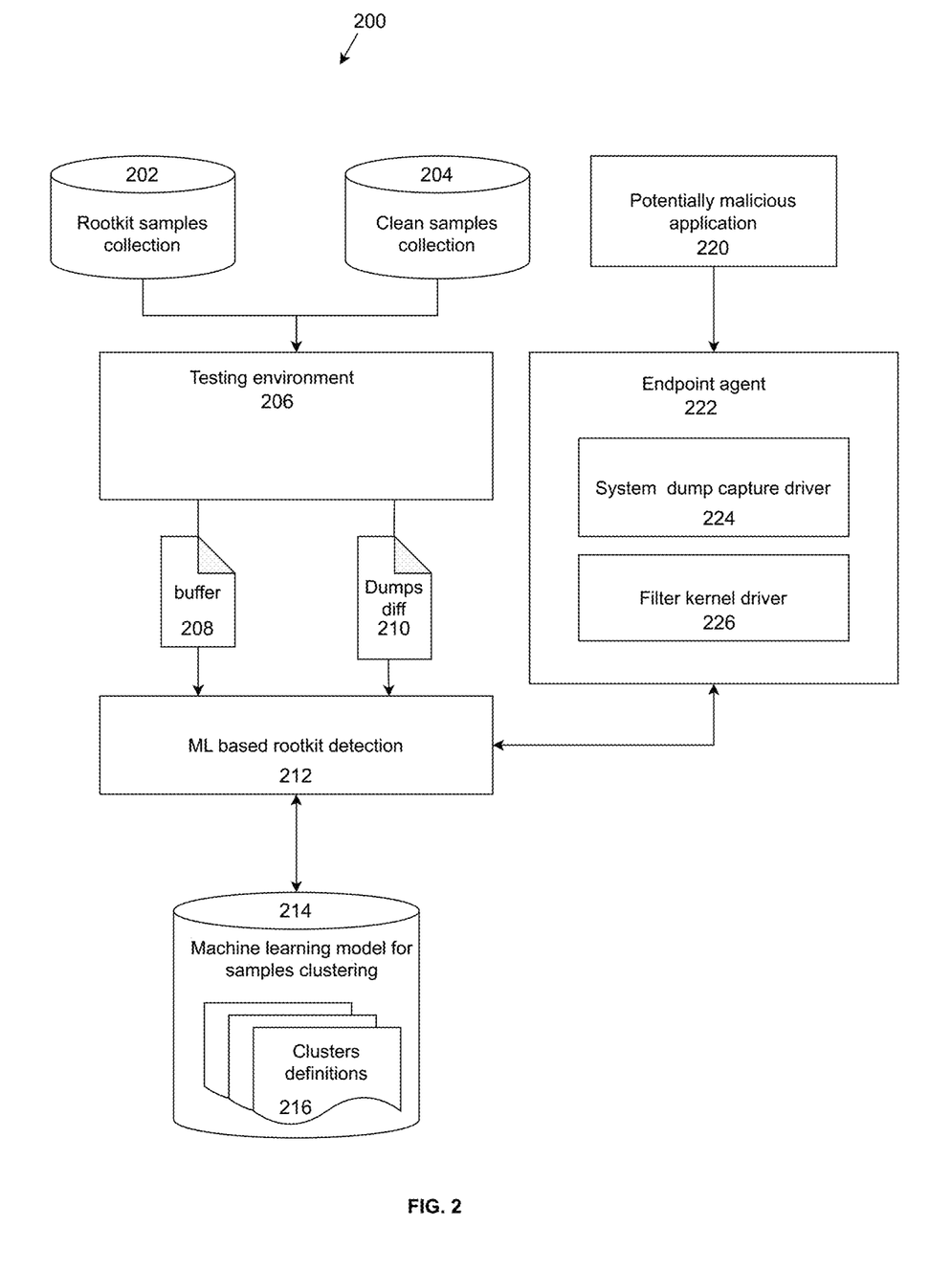
FIG. 2 shows a system for rootkit detection including a potentially malicious application.

FIG. 2 shows system 200, an alternative embodiment for rootkit detection including rootkit samples collection 202 and clean samples collection 204. Rootkit samples from collection 202 and clean samples from collection 104 are provided as inputs for testing environment 206. Samples from collections 202 and 204 include not only executable code, but also related software such as installers, downloaders, and so on. In testing environment 206, all operations addressed to a driver are logged in buffer 208. Before installing a rootkit sample and performing rootkit functions in testing environment 206, a memory dump of the test environment is taken for each sample or set of samples from rootkit samples collection 202. During the test infection, more memory dumps are taken. For example, a memory dump corresponding to the state of the system in the process of being infected may be taken, including a memory dump corresponding to the active infection of the system with a rootkit and the execution of the rootkit's main functions. The plurality of memory dumps is compared and difference stored as dumps diff 210. This process is repeated for a predetermined number of rootkit samples in collection 202 and clean samples in collection 204. The buffer 208 and dump diff 210 for each sample are sent to machine learning based rootkit detection unit 212 for rootkit cause analysis. The object of this analysis is to determine the driver operations that are linked with rootkit infections. Buffers are paired with dump diffs to create clusters that will be correlated to the presence or absence of a rootkit. The output of pairs analysis is passed to machine learning model for samples clustering 214 which comprises cluster definitions 216. Clusters are established by machine learning model 214 for samples clustering. Clustering is a machine learning technique that involves grouping a set of data points. A clustering algorithm is used to classify each data point into a specific group with similar properties or features. At least one cluster will be the dataset that characterizes a rootkit infection. Predicted features of such clusters are buffer and API calls, memory pages, and memory dumps. As described above in connection with FIG. 1, pairing may be accomplished by different methods. For example, a Siamese neural network Triplet network or may be used.

Endpoint protection within system 200 begins with identification of potentially malicious application 220. This application 220 is monitored and subject to the control of endpoint agent 222. Endpoint agent 222 comprises system dump capture driver 224 and filter kernel driver 226. Filter kernel driver 226 intercepts and checks input/output (I/O) requests to the system drivers from potentially malicious application 220. System dump capture driver 224 records system memory dumps to determine changes in system state before and after execution of the requests from potentially malicious application 220. Thus, system dump capture driver 224 can pass the diff of a plurality of memory dumps and buffers intercepted by filter kernel driver 226 to the machine learning model for samples clustering 214 by way of machine learning rootkit detection unit 212.

Once trained, machine learning model for samples clustering 214 classifies new potentially malicious applications by way of clustering algorithms that operate on buffer and memory dump diffs. Alternatively, the buffer intercepted by filter kernel driver 226 can be compared to cluster definitions 216 to determine the presence or absence of a rootkit.

Figure 3:
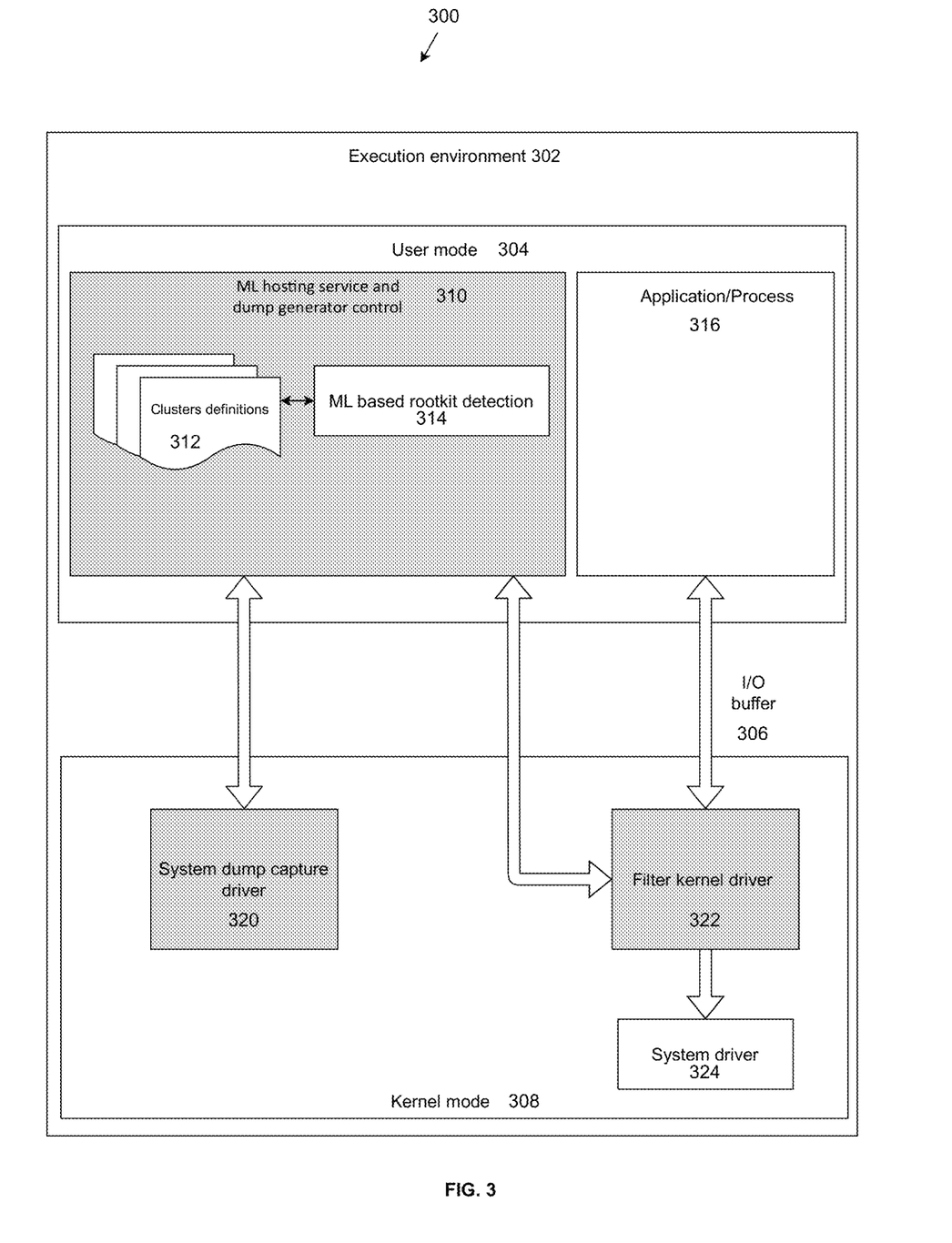
FIG. 3 shows a system for rootkit detection including the relationship between user mode and kernel mode in an execution environment.

FIG. 3 shows a system 300 for rootkit detection including the relationship between user mode and kernel mode in an execution environment. System 300 comprises an execution environment 302 with user mode 304, I/O buffer 306, and kernel mode 308. User mode 304 comprises machine learning hosting service and dump generator control unit 310, which further comprises clusters definitions 312 and machine learning rootkit detection unit 314. User mode 304 also includes an application or process 316. Kernel mode 308 comprises system dump capture driver 320, filter kernel driver 322, and system driver 324.

In use, filter kernel driver 322 protects system driver 324 by intercepting I/O buffer 306 and passing it to machine learning hosting service and dump generator control unit 310. The intercepted buffer may be compared to clusters definitions 312 for rootkit classification. Alternatively, the intercepted buffer may be passed to machine learning based rootkit detection unit 314. In parallel, memory diffs are passed from system dump capture driver 320 to rootkit detection unit 314. From these two inputs, rootkit classification can be made by rootkit detection unit 314 in accordance with one or more of the pairing and clustering methods described in connection with FIGS. 1 and 2.

Figure 4:
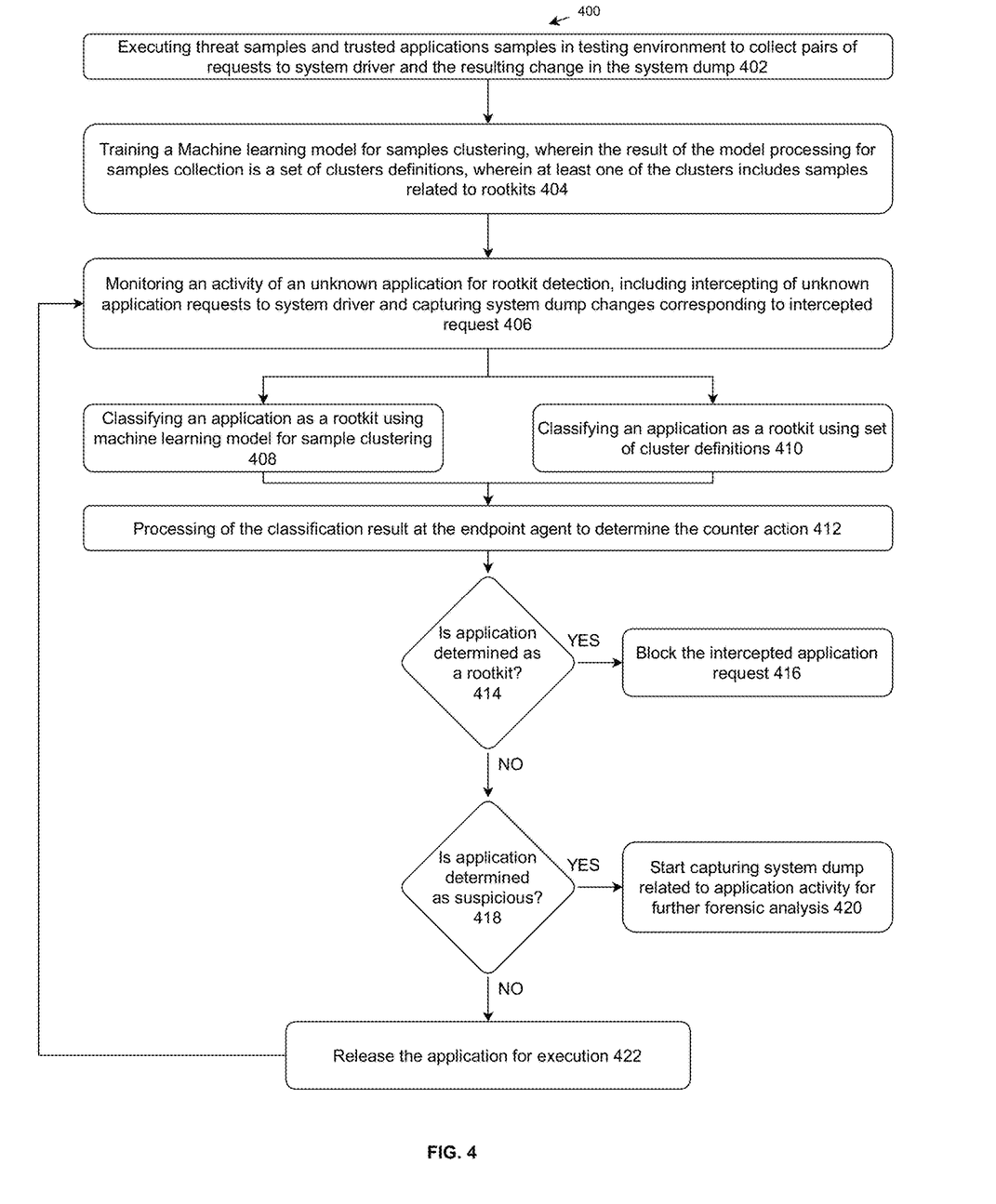
FIG. 4 shows a method for rootkit detection using a machine learning model for samples clustering.

FIG. 4 shows method 400 for implementing an embodiment of the invention. At step 402, threat samples and trusted applications samples are executed in a testing environment to collect pairs of requests to a system driver and the resulting change in the system dump 402. A machine learning model for samples clustering is trained at step 404. The result of the model's processing of the samples collection is a set of clusters definitions. At least one of the clusters includes samples related to rootkits. Then, at step 406 an activity of an unknown application is monitored for rootkit detection. This includes intercepting unknown application requests to the system driver and capturing system dump changes corresponding to an intercepted request.

An application is classified as a rootkit using the machine learning model for sample clustering at step 408. Alternatively, an application is classified as a rootkit using a set of cluster definitions at step 410. The classification results are processed at step 412 at an endpoint agent to determine the appropriate counter action. At step 414, if the application is determined to be a rootkit, then the application's request is blocked at step 416. If the application is not determined to be a rootkit at step 414, a determination is made at step 418 whether the application is suspicious. If so, then at step 420 system dump capturing begins related to whole system activity or application activity for further forensic analysis. If the application is not determined to be suspicious at step 418, then the application is released for execution at step 422.

Determinations at steps 414 and 416 are made in accordance with different degrees of certainty in the results of rootkit classification. An application may be determined to be a rootkit at step 414 by, for example, finding that the application closely matches a set of cluster definitions for rootkits. On the other hand, an application may be determined to be suspicious at step 418 by, for example, obtaining a clustering result resembling known threat samples.

The invention claimed is:

1. A computer implemented method for protecting control device objects of a system driver in a computer system, the method executed on a processor, the method comprising:
   collecting, in a testing environment, a first input/output ("I/O") buffer to the system driver;
   collecting, in a testing environment, a first system memory dump before execution of the first I/O buffer by the system driver;
   collecting, in a testing environment, a second system memory dump during execution of the I/O buffer by the system driver;
   identifying a difference between the first and second system memory dumps;
   pairing the first I/O buffer with the difference;
   repeating the foregoing steps until a plurality of first I/O buffers are paired with a plurality of differences;
   training a machine learning model for samples clustering using the plurality of paired first I/O buffers and differences;
   identifying a set of clusters definitions, wherein at least one of the clusters includes samples related to rootkits;
   collecting, outside the testing environment, a second I/O buffer to the system driver;
   passing the second I/O buffer to the machine learning model for clustering; and
   allowing the second I/O buffer to pass to the system driver for execution if the machine learning model determines that the second I/O buffer is not clustered with a rootkit-related cluster definition.

2. The method of claim 1 further comprising the step of intercepting an I/O buffer from an unknown application outside the testing environment to the system driver.

3. The method of claim 2, further comprising the step of capturing a difference in system memory dumps corresponding to the intercepted I/O buffer outside the testing environment, wherein the difference capture is performed by a filter kernel driver without rebooting the computer system.

4. The method of claim 2 further comprising the step of determining that the unknown application is likely to be a rootkit using the machine learning model for samples clustering or the set of cluster definitions and blocking execution of the intercepted I/O buffer.

5. The method of claim 4 further comprising the step of collecting, outside the testing environment, the intercepted application I/O buffer to the system driver and pairing a difference in system memory dumps corresponding to the intercepted I/O buffer.

6. The method of claim 4 further comprising the step of training the machine learning model using the paired intercepted I/O buffer and the difference in system memory dumps.

7. A system for protecting a system driver from a rootkit in a computer system comprising:
   an execution environment comprising a microprocessor and a nontransitory storage medium;
   a user mode within the execution environment, wherein the user mode further comprises a machine learning based rootkit detection model and one or more clusters definitions;
   a kernel mode within the execution environment, wherein the kernel mode further comprises a filter kernel driver and a system memory dump capture driver;
   wherein the filter kernel driver is configured to intercept an I/O buffer from an application to the system driver;
   wherein the filter kernel driver is configured to pass the intercepted I/O buffer to the machine learning based rootkit detection model; and
   wherein the filter kernel driver is configured to block execution of the I/O buffer by the system driver unless the machine learning based rootkit detection model returns a verdict that the I/O buffer is not clustered with a rootkit-related cluster definition.

8. The system of claim 7, wherein the machine learning rootkit detection model has been trained with a collection of rootkit samples and a collection of clean samples paired with I/O buffers.

9. The system of claim 8, further comprising a testing environment for collecting data corresponding to the rootkit samples and the clean samples.

10. The system of claim 9, wherein the testing environment comprises an operating system modeled after the execution environment.

11. The system of claim 10, wherein the testing environment is configured to record a difference between first and second system memory dumps corresponding to before and after a sample is executed for testing.

12. The system of claim 11, wherein machine learning rootkit detection model is configured to receive for training paired buffers and memory dump differences of the sample executed for testing.

13. A computer implemented method for rootkit prevention, the method executed on a processor at an endpoint in a computer system with a system driver, the method comprising:
   monitoring an unknown application for rootkit detection by intercepting an I/O buffer from the unknown application to the system driver;
   determining whether the unknown application is a rootkit using a machine learning model for samples clustering trained using paired I/O buffers to the system driver and corresponding differences in system memory dumps, wherein a plurality of the paired I/O buffers and corresponding differences in system memory dumps are collected in a testing environment; and allowing execution of the I/O buffer from the unknown application if the machine learning model for samples clustering determines that the I/O buffer is not clustered with a rootkit-related cluster definition.

14. The method of claim 13, wherein determining whether the unknown application is a rootkit further comprises the step of identifying a set of clusters definitions from paired system driver requests and corresponding system memory dump changes.

15. The method of claim 14, wherein at least one of the clusters includes samples related to rootkits.

16. The method of claim 15, further comprising the step of determining whether the unknown application is a rootkit using the set of cluster definitions.

17. The method of claim 13, further comprising the step of blocking the unknown application's I/O buffer if the unknown application is determined to be a rootkit.

18. The method of claim 13, further comprising the step of collecting, outside the testing environment, a set of intercepted application I/O buffers to the system driver and differences in system memory dumps corresponding to an intercepted request.

19. The method of claim 16, further comprising the step of blocking the unknown application's I/O buffer to the system driver if the unknown application is determined to be a rootkit.

20. The method of claim 16, further comprising the step of releasing the I/O buffer to the system driver for execution after blocking when the machine learning model for samples clustering determines that the I/O buffer is not clustered with a rootkit-related cluster definition.

* * * * *